UNITED STATES PATENT OFFICE.

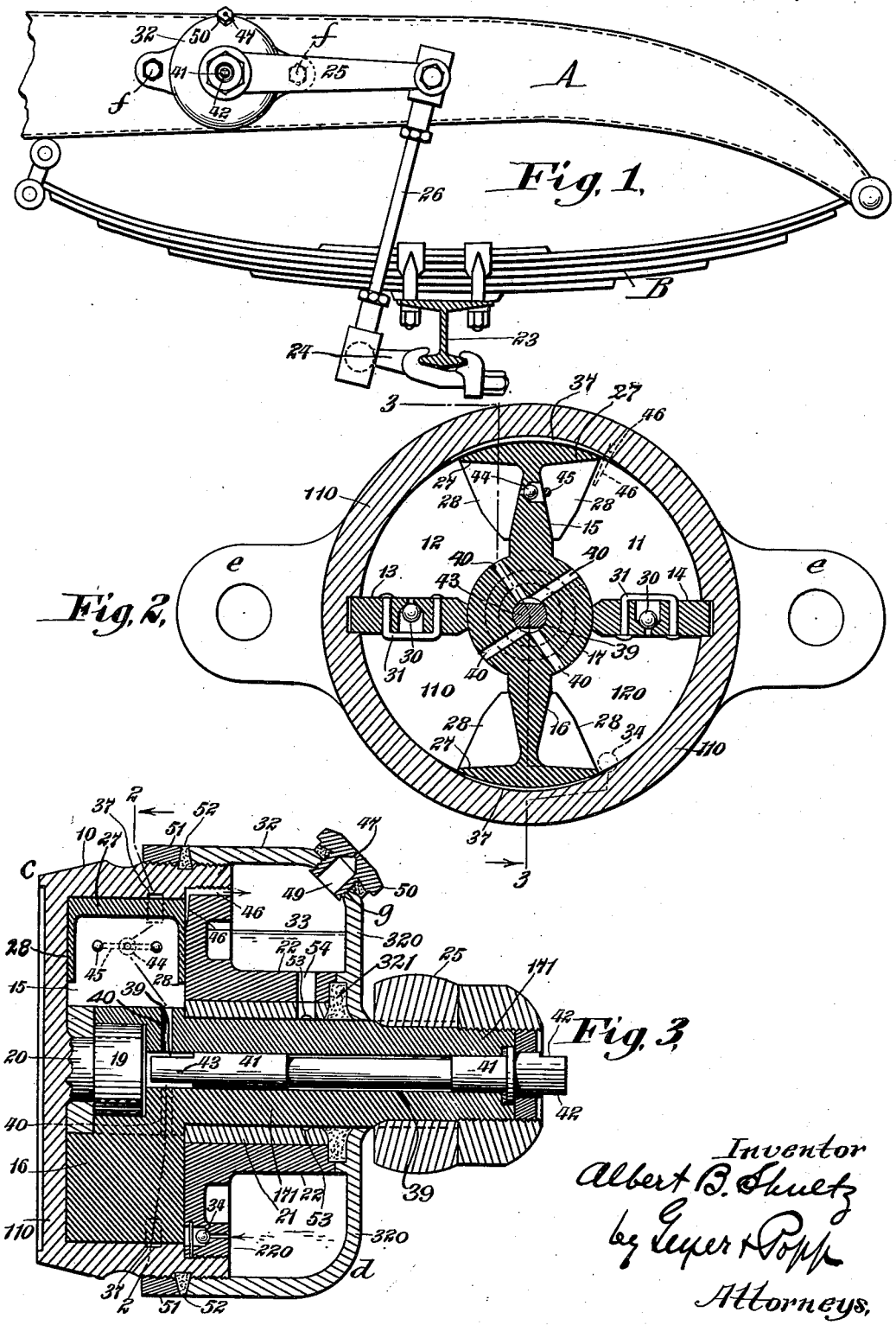

ALBERT B. SHULTZ, OF BUFFALO, NEW YORK.

SHOCK ABSORBER.

1,426,115.          Specification of Letters Patent.     Patented Aug. 15, 1922.

Application filed August 8, 1921. Serial No. 490,442.

*To all whom it may concern:*

Be it known that I, ALBERT B. SHULTZ, a citizen of the United States, residing in Buffalo, in the county of Erie and State of New York, have invented new and useful Improvements in Shock Absorbers, of which the following is a specification.

This invention relates to a shock absorber of the type in which a liquid is forced from one place to another and serves as the resisting medium for cushioning the shock.

The objects of this invention are to provide a shock absorber of this character which is so constructed that the same exerts practically no checking or shock absorbing effect during the middle of the stroke of the apparatus and thus avoids interfering with the free, easy riding of an automobile when the same is traveling over a comparatively even roadway, but which offers a considerable resistance at both ends of the stroke of the apparatus, so as to absorb the shock on the vehicle when the same is traveling over comparatively rough roads; also to improve the construction of the pistons, so that the same engage over a comparatively wide surface with the walls of the pistons or pressure chambers and thus not only form a more perfect guide for the pistons which will prevent distortion and undue wear and will also prevent undue leakage of the liquid from one end of a pressure chamber to the opposite end of the same; also to improve the means for controlling the passage of the liquid from one end of a pressure chamber to the opposite end thereof so that each piston when effecting its high pressure stroke will encounter a comparatively moderate liquid resistance during the main part of the stroke, but will encounter a practically solid liquid body and a maximum resistance of the same during the last part of the high pressure stroke of a piston and thus cushion the vehicle during a rebound, when passing over extremely rough roads; also to provide improved means for removing from the pressure chambers any undue amount of air which may be entrained in the resisting liquid and thus ensure a full supply of liquid in the pressure chambers at all times and maintain the shock absorber in a condition of maximum efficiency; and also to provide simple and efficient means whereby a free vent is afforded between the liquid replenishing chamber and the external atmosphere which will permit the resisting liquid to freely expand and contract due to changes in temperature, while at the same time preventing this liquid from creeping through the vent opening to the exterior of the apparatus and necessitating frequent replenishing of the same.

In the accompanying drawings:

Figure 1 is a side elevation, partly in section, of the chassis of an automobile equipped with my improved shock absorber. Figure 2 is a transverse section of the shock absorber embodying my improvements, the section being taken on line 2—2, Fig. 3. Figure 3 is a vertical longitudinal section of the shock absorber, taken on line 3—3, Fig. 2.

Similar characters of reference refer to like parts throughout the several views.

This improved shock absorber may be applied in various ways to the relatively movable parts of an automobile or other structure for the purpose of checking and absorbing any shock which would result from such movement and the application of this invention, as shown in the drawings, is therefore to be taken as merely an example of a variety of applications of which this invention is capable.

As shown in Fig. 1 the shock absorber is applied to the chassis of an automobile which comprises one of the longitudinal side bars A of the main frame, an axle 23 arranged underneath the side bar and a semi-elliptical spring B having its central part connected with the upper part of the axle and its hinge pivotally connected with the frame side bar A.

My improved shock absorber includes a casing for enclosing the various parts which supply, control and operate upon a liquid which serves as the shock absorbing agent or medium, which casing in its preferred form consists of a rear pressure section *c* and a front storage section *d*. The rear pressure section preferably consists of an annular circumferential wall 10 which is closed at its rear end by a transverse wall or head arranged at right angles to the axis of the circumferential wall and provided on opposite sides with laterally projecting lugs

*e* which are secured to the outer side of the frame bar A by means of bolts *f* or other suitable means. The front or storage section of the enclosing casing consists of an annular peripheral wall 32 which is closed at its front end by means of a transverse head 320, while its rear or inner end is provided with an internal screw thread engaging with an external screw thread on the front end of the wall 10 of the rear casing section. A leak tight joint is produced between these two casing sections and the front casing section is firmly held in a definite position with reference to the rear casing section by a packing and clamping device which preferably consists of a clamping ring 51 provided with an internal screw thread engaging with an external screw thread on the front part of the rear casing section and a packing ring 52 interposed between the clamping ring 51 and the peripheral wall 32 of the front casing section, as shown in Fig. 3. The space between the front and rear casing sections is divided by a transverse partition wall 220 arranged at right angles to the axis of the casing, which partition is secured in place by means of an external screw thread formed on the periphery thereof and engaging with an internal screw thread on the rear part of the circumferential wall 10 of the rear casing section.

From the central part of the intermediate wall or partition 220 a tubular boss 22 extends forwardly to the front end of the wall 320 of the front casing section, thereby forming in the latter an annular replenishing reservoir or tank 33 in which is adapted to be stored a supply of the liquid which serves as the shock absorbing medium, such as glycerine or oil. This liquid is supplied to the storage chamber through a filling opening *g*, which opening is normally closed by a screw plug 50.

During the operation of the shock absorber the shock absorbing liquid becomes heated so that the level of the same in the storage or replenishing chamber rises and falls in response to the variations in the temperature of this liquid and for this reason free communication must be established between the interior of the storage chamber and the outer atmosphere. In the preferred construction a vent passage for this purpose is formed in the screw plug 50. It has been found however, that when a vent passage of uniform length is formed in the plug 50 of the filling passage, that the oil or other liquid which is used as the shock absorbing agent, tends to creep through such vent passage to the exterior of the apparatus so that the supply of liquid is liable to be lowered accidentally or through over sight, to such an extent, as to impair the efficiency of the shock absorber.

To overcome this, the vent passage of the plug 50 is so constructed that the same has an enlarged inner part 49 and a reduced outer part 47, the enlarged inner part being comparatively long and the reduced inner part comparatively short. Due to this construction, no creeping of the oil through the enlarged inner part of the vent passage is possible, owing to the absence of surface tension or capillary action, and the reduced outer part 47 thereof forms an orifice which is so small and short, that practically no oil can creep through the same due to surface tension or capillary action.

The space between the rear section of the enclosing casing C and the partition 220 is divided into upper and lower segmental pressure chambers by means of two partitions 13 and 14, which are arranged horizontally in line and project radially inward from opposite sides of the bore on the peripheral wall 10 of the rear casing section and a cylindrical hub 17 which engages opposite sides of its periphery with the inner ends of the partitions 13 and 14. This hub carries two pistons which oscillate in the pressure chambers and is provided on its rear side with a circular recess which receives a collar 19 mounted on a central pin 20 which projects forwardly from the central part of the rear wall 110 of the rear casing section, thereby forming the central bearing for the pistons. The hub of the pistons is also provided with a forwardly projecting piston shaft 171 which extends forwardly through the partition 220, the boss 22 of this partition, and also through the front wall 320 of the front casing section, this shaft being journaled in a bushing 21 arranged in the bore of the bushings 22, as shown in Fig. 3.

A rocking motion is imparted to the piston shaft 171 and the pistons connected therewith by the movement of the axle 23 toward and from the frame A, this being preferably effected by means which are shown in Figs. 1 and 3 and which consist of a rock arm 25 secured at its inner end to the piston shaft in front of the casing, a bracket 24 secured to the axle 23, and the upright rod 26 pivotally connected at its upper and lower ends with the rock arm 25 and the bracket 24, respectively.

The space within the upper pressure chamber is divided by the piston therein, so that the end 11 of this chamber forms the high pressure end thereof and the opposite end 12, the low pressure end of the same, and the piston within the lower pressure chamber divides the latter so that the end 110 thereof forms the high pressure end of the lower pressure chamber and the opposite end 120 thereof forms the lower pressure end of the same, these several high and low pressure ends of the two pressure chambers being arranged in an annular row and on the axis of the pressure section of the casing and the high and low pressure ends of these chambers alternating with each other, so that the high pressure end of each chamber is on one side of one of the partitions 13 and 14 and the low pressure end of the other chamber on the opposite side of the respective pressure chamber. The high and low pressure ends of the upper pressure chamber are arranged at right and left hand sides of the upper pressure chamber and the high and low pressure ends of lower pressure chamber are arranged at the left and right hand sides of the lower piston, as shown in Fig. 2.

The liquid forming the resisting medium of the shock absorber passes through the lower part of a replenishing reservoir through a port in the lower part of the lower pressure chamber, which port is controlled by means of a check valve 34 opening toward the lower pressure chamber and closing toward the replenishing reservoir. The liquid is permitted to pass from the low pressure end of the lower pressure chamber upwardly under the high pressure end of the upper pressure chamber through a port in the divided end partition 14 which is closed by a check valve 30 opening toward the high pressure end of the upper chamber and held against displacement by means of a retainer 31. A similar valve 30 opening toward the high pressure end of the lower pressure chamber controls a port in the left hand partition 13 which permits the passage of liquid from the low pressure end of the upper pressure chamber with the high pressure end of the low pressure chamber, this last-mentioned valve being also held against displacement by means of the retainer 31.

The pistons arranged in the upper and lower pressure chambers comprise wings 15, 16 projecting upwardly and downwardly on the hub 17 of the piston shaft, into the upper and lower pressure chambers, so that the outer ends of these wings engage the bore of the circumferential wall 10 of the rear casing section and the opposite longitudinal edges of these wings engage with the flat ends or sides of the pressure chamber which are arranged at right angles to the axis of the piston shaft and the casing.

When the spring B and the frame member A approach each other due to the wheel of the car striking an obstruction, the piston shaft is turned in a direction which causes the pistons to move toward the low pressure ends of their respective pressure chambers, thereby causing the liquid in each of these low pressure ends to be forced past the respective check valve 30 into the high pressure end of the other pressure chamber, so that at this time the liquid only offers a moderate resistance to the movement of the pistons in this direction and exerts a corresponding cushioning and retarding effect upon the movement of the car frame and spring toward each other. During the rebound or movement of the spring B and frame A away from each other the movement of the pistons is reversed, during which time the check valves 30, 30 are closed so that now a greater resistance is offered to the movement of the pistons in the pressure chambers toward the high pressure ends thereof, whereby the shock absorbing effect during the rebound or movement of the frame and spring away from each other, is increased accordingly.

It has been found that in shock absorbers of this type as heretofore constructed, the pistons, owing to the small contact surface between the same and the circumferential and side walls of the pressure chambers, are liable to become distorted or cramped, thereby not only reducing the efficiency of the shock absorber, but also wear the cooperating surface unduly, so that undue leakage of the liquid past each piston from one end thereof to the other occurs and therefore causes the shock absorber to work unevenly and without certainty. To avoid this, means are provided whereby an increased bearing surface is produced between the pistons and the walls of their respective chambers which in the preferred construction consists in providing the outer end of each piston wing with circumferential flanges 27 which project circumferentially from opposite sides of the outer end of the respective piston wing and engage their concentrically curved peripheries with the bore of the circumferential wall of the rear casing section and also providing each of the piston wings with radial flanges 28 which are arranged on opposite sides of each longitudinal edge portion of the wings at right angles to the axis of the piston shaft and engage with the flat ends or sides of the pressure chambers, as shown in Figs. 2 and 3. By this means a wide and extended bearing surface is provided between each of the pistons and the cooperating surfaces of the respective pressure chamber, which not only reduces the possibility of leakage from one end to the other of the respective pressure chamber past a piston but also operates to center the pistons and parts associated therewith, so that no distortion or cramping action of the pistons can take place, thereby not only ensuring greater resistance due to the reduction of leakage, but also increasing the strength of the pistons and minimizing the cost of the upkeep by reason of the reduction in wear of the parts.

When an automobile is traveling over a comparatively smooth and even roadway, there is no particular need for a shock absorber and it is therefore desirable at this time to either cut out or reduce the check or absorbing effect of the shock absorber, inasmuch as the resilience of the springs of an automobile ought to be left free to furnish the necessary yielding support for the load. In order to accomplish this, means are provided in the present shock absorber which practically render the pistons effective only to a small degree during the middle of the stroke of each piston, but enables the same to exert an effective shock absorbing pressure upon the liquid in the high pressure ends of the pressure chambers after passing the central part of the high pressure stroke.

This is effected in the present case by providing the central part of the bore of the circumferential wall 110 midway of the low and high pressure ends of each pressure chamber with a circumferential relief groove or channel 37 which groove is deepest midway of its length and gradually reduces in depth at its opposite ends, which latter merge into the bore of the respective pressure chamber. It follows from this construction that the pistons vibrate only slightly while in their central position about midway between opposite ends of the pressure cylinders, as indicated in Fig. 2. Each piston is permitted to move comparatively free in either direction from its central position without any appreciable retarding effect by the liquid in the pressure chamber, inasmuch as this liquid is free to pass through the relief passage 27 from one end of the respective pressure chamber to the other. When, however, the pistons are rocked to a considerable extent, due to a considerable movement of the frame and spring, relatively to each other, each of the pistons after passing the central position during its high pressure stroke, will pass beyond the groove 37, so that the liquid in front of the piston can now not escape through the groove 37 and thereby exerting greater resisting effect of the forward movement of the piston and thereby exerting a corresponding increased cushioning effect upon the relative movement of the frame A and the spring B.

This reduction in the cushioning effect of the liquid in front of each piston toward its high pressure stroke, but maintaining its full cushioning effect during the last part of the stroke is also accomplished by means of an angular relief passage 40, 40, extending from the periphery of the hub 17 on the high pressure side adjacent the piston wing toward the center of this hub and then outwardly to the surface of this hub adjacent to the low pressure side of the respective piston wing. The location of the opening of the passage 40 on the periphery of the hub adjacent to the high pressure side of the respective piston is such that when each piston is in the central part of its stroke the high pressure end of the port 40 is uncovered, thereby permitting the liquid in the high pressure end of the respective pressure chamber from this end to the companion low pressure end until the respective piston has continued about three quarters of its high pressure stroke, after which the high pressure end of the relief port 40 passes under the adjacent partition 13 or 14 so that this relief passage is closed and prevents the further escape of liquid from the high pressure end to the low pressure end of the respective pressure chamber, thereby causing the liquid at the high pressure end to exert its maximum resistance during the last part of the high pressure stroke of the respective piston and thus reduces the maximum cushioning effect upon the relatively movable frame and spring of the car which at this time is subjected to the greatest rebound action.

In practice, the inner ends of the relief passages 40 of both pressure chambers lead to the inner or rear end of a cylindrical opening 39 formed axially in the hub 17 and shaft 171 of the pistons and the sides of these passages and the movement of the liquid through these passages is controlled by means of a valve stem 41 journaled in the opening 29 and provided at its inner or rear end with a valve head 43 which may be turned so as to either fully uncover or fully close the passages 40, or to leave the same partly open. As shown in Fig. 2, this valve head has been turned so as to leave the relief passages 40 fully opened, but upon turning the valve stem 41 in either direction, it is obvious that the passage 40 will be closed more or less and thereby enable the shock absorber to be adjusted to suit the load which is likely to be imposed upon the same.

The regulating valve stem 41 extends beyond the front end of the piston shaft 171 and is provided on the flat side with a front end 42 which permits of applying a wrench or other instrument thereto for turning this regulating valve stem.

Owing to the continuous vibration and oscillation of the pistons, more or less air is liable to be drawn into the oil from the replenishing chamber into the pressure chambers, which air would accumulate in the upper part of the upper pressure chamber and interfere and gradually displace the oil therein, if no means were provided for preventing such an occurrence, thereby reducing the shock absorbing efficiency of this device. In order therefore to constantly expel the air which enters the upper part of the upper pressure chamber, a small air vent groove or passage 46 is provided which is arranged on the upper part of that side of the partition 220 forming the front wall of the upper pressure chamber and extending along the periphery of the wall 220 to the upper part of the replenishing tank 33, as shown by full lines in Fig. 3 and by dotted lines in Fig. 2, and the upper part of the wing of the upper piston is provided with a port which is controlled by a check valve 44 opening toward the high pressure side of this piston and closing in the opposite direction thereof and held against displacement on the respective piston wing by means of a retainer 45.

During the low pressure stroke of the upper piston which is usually very quick, any air which may be present in the upper part of the pressure chamber on the low pressure side of the same will pass with or without some of the oil past the valve 44 into this upper chamber on the high pressure side of the upper piston, which air during the subsequent high pressure stroke of the upper piston will be forced from the high pressure end of the low pressure chamber out of the same through the vent port 46 and into the replenishing reservoir 23 with or without a small quantity of oil. After the upper piston has passed the central part of its high pressure stroke, the vent passage 46 is closed by the upper piston so that during the remaining high pressure stroke of the piston no further escape of air from the respective pressure chamber to the replenishing reservoir occurs but instead the liquid in this upper pressure chamber on the high pressure side of the upper piston will offer its resistance with a continued forward movement of the same for absorbing the shock of the car.

Owing to the high pressure to which the liquid is subjected by the pistons in the pressure chambers, a small quantity of the liquid leaks forwardly between the piston shaft and the bushing 21 which leakage, however, enters an annular groove 53 in the outer part of the bore of the bushing 21 and is returned from this groove by a passage 54 to the replenishing reservoir, from which it is again returned to the pressure chambers and thereby preventing the same from reaching the exterior of the device. As a further precaution against any liquid escaping to the exterior of the device along the piston shaft, the latter is surrounded between the outer end of the bushing 21 and the head 320 of the replenishing reservoir by a packing ring 321, as shown in Fig. 3.

By means of the foregoing improvements this shock absorber is not only materially strengthened and not liable to break or wear unduly when subjected to working strains, but the pressure chamber is constantly filled with a sufficient amount of oil or other liquid to obtain the maximum efficiency of the shock absorber at all times, and leakage of oil to the exterior of the apparatus is practically eliminated so that the device is maintained in its best working condition without requiring frequent renewal of the supply of oil to the replenishing reservoir.

I claim as my invention:

1. A shock absorber comprising a pressure chamber having a curved peripheral wall and two flat side walls arranged at right angles to the axis of said curved wall, and a piston oscillating in said chamber and having a hub journaled concentrically with said peripheral wall, a wing extending outwardly from said hub to said peripheral wall and engaging its opposite longitudinal edges with said side walls, circumferential flanges projecting circumferentially from opposite sides of said wing and in engagement with said peripheral wall, and radial flanges projecting from opposite sides of said wing adjacent to its longitudinal edges and in engagement with said side walls.

2. A shock absorber comprising a pressure chamber, a piston oscillating in said chamber, and means for supplying liquid to said chamber, the peripheral wall of said chamber being provided midway between the ends of the same with a peripheral groove which is deepest midway of its length and gradually decreasing in depth toward its opposite ends.

3. A shock absorber comprising a pressure chamber, a piston oscillating in said chamber, and a liquid replenishing reservoir from which said piston chamber is supplied with liquid, said liquid replenishing reservoir and said piston chamber being connected by an air vent passage at the high pressure end of said chamber.

4. A shock absorber comprising a pressure chamber, a piston oscillating in said chamber, a liquid replenishing reservoir from which said piston is supplied with liquid, and a valve which permits liquid to pass from the low pressure end of said chamber toward the high pressure end of the same during the low pressure stroke of the piston and vice versa, said replenishing reservoir and piston chamber having their upper parts connected by an air vent passage which is adapted to be closed by the piston during the latter part of the high pressure stroke of the same.

5. A shock absorber comprising a pressure chamber, a piston oscillating in said chamber, and means for supplying a liquid to said chamber on opposite sides of said piston, said piston being provided with a relief passage extending from one side of the same to the other and that end of this passage on the side of the piston which advances during the high pressure stroke of the same being closed during the last part of this stroke.

6. A shock absorber comprising a pressure chamber, a piston oscillating in said chamber, and means for supplying a liquid to said chamber on opposite sides of said piston, said piston being provided with a relief passage extending from one side of the same to the other and that end of this passage on the side of the piston which advances during the high pressure stroke of the same being closed during the last part of this stroke by the movement of this end of said passage past a portion of a wall of said chamber.

7. A shock absorber comprising a pressure chamber, a piston oscillating in said chamber, a replenishing reservoir from which liquid is supplied to said pressure chamber and which is provided with a filling opening in its upper part, and a plug closing said opening and having a vent passage therethrough which has an enlarged inner part and a reduced outer part.

ALBERT B. SHULTZ.